Figure 1:
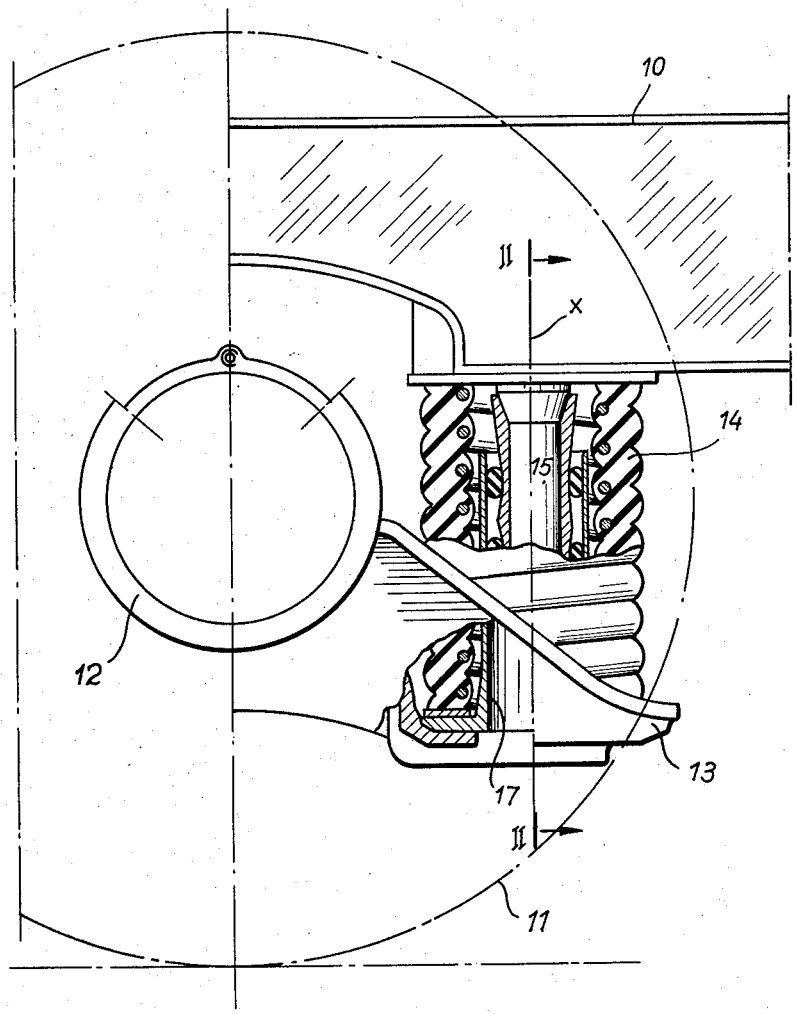

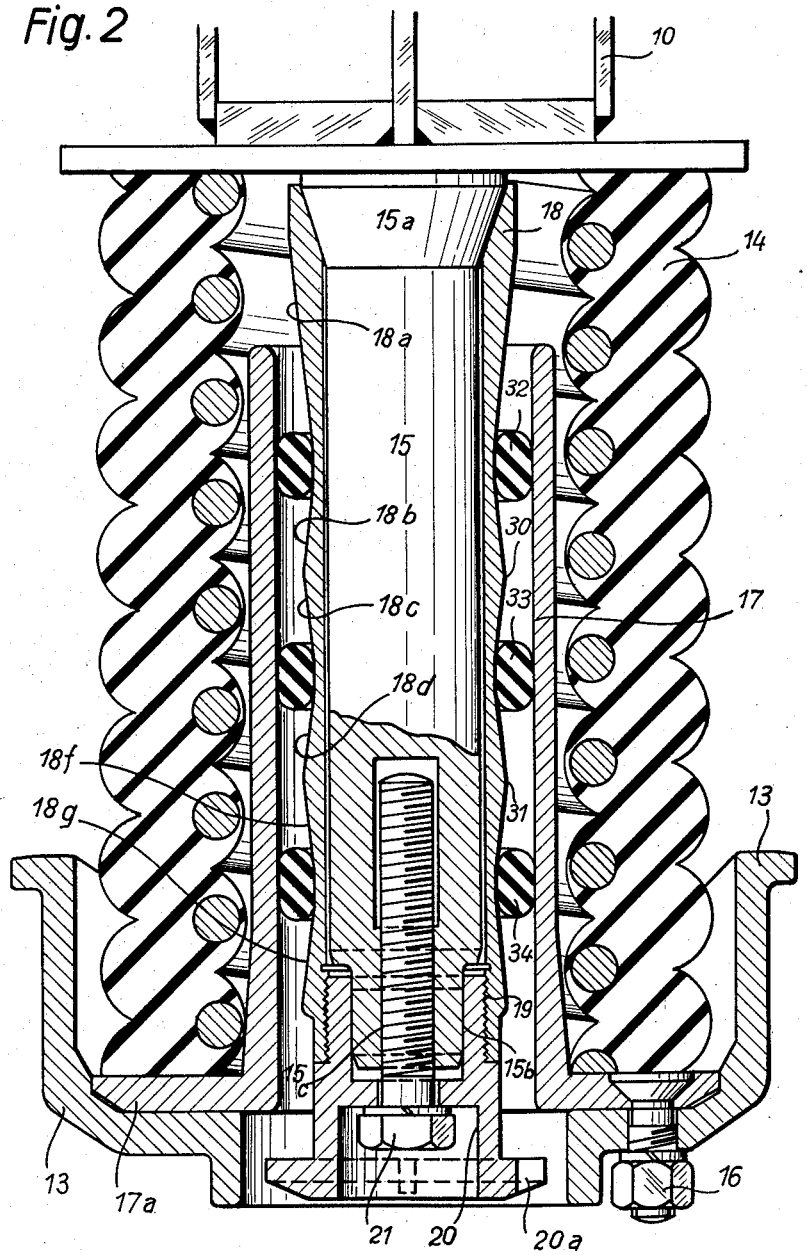

United States Patent Office 2,884,872
Patented May 5, 1959

2,884,872

ELASTIC GUIDE MEANS, PARTICULARLY FOR A VEHICLE SUSPENSION

Antonio Boschi, Milan, Italy, assignor to Societa Applicazioni Gomma Antivibranti "S.A.G.A." Societa per Azioni, Milan, Italy Application July 31, 1957, Serial No. 675,398

Claims priority, application Italy September 12, 1956

2 Claims. (Cl. 105—224)

This invention relates to elastic guide means for machine and other parts arranged for relative reciprocal movements. For example, in railway vehicles it is desirable to so mount the axle bearing on the bogie that the axle bearing may move freely in a vertical plane but will be resiliently restrained against any excessive movement in horizontal direction.

Guide means of this type generally comprise male and female elements in coaxial relationship, and a plurality of toroidal bodies of rubber coaxially interposed between the elements, whereby axial reciprocatory movements between the elements cause the bodies to roll, while any lateral relative displacement of the elements causes the bodies to be compressed thereby restricting such displacement.

Some difficulties arise with this type of guiding device, in keeping the rolling bodies axially separated from each other.

The main object of this invention is to eliminate this difficulty by providing a guiding device wherein at least one of the elements on which the rubber bodies roll, has its cross-sectional area or diameter alternately and gradually increasing and decreasing, whereby the zones of maximum cross-sectional area or diameter provide for the longitudinal spacing of the rolling bodies.

Further features and advantages of the present device will appear from the following description in which reference is made to the appended drawing showing a preferred embodiment of the device and wherein:

Figure 1 schematically shows part of a resilient suspension for a railway vehicle embodying the guiding device, and Figure 2 is an axial cross-sectional view on line II—II of Figure 1, showing one of the suspension springs with associated guiding structure.

In the drawing a frame 10 of a railway vehicle or bogie is shown, having a pair of wheels one of which is indicated at 11. The ends of the axle carrying the wheel 11 are supported in the known manner by axle boxes 12, each provided with two brackets 13 of which only one is shown in the drawing. Between each of the brackets 13 and the frame 10 there is a suspension spring 14, which in the example illustrated is a composite spring comprising a hollow cylindrical rubber body having an undulated cross-sectional shape, and a steel coil spring embedded in the body.

The general axis X of the spring 14 is vertical, so that the frame 10 is elastically suspended in respect to the axle box 12.

Provision is generally made in constructions of this type for guiding the movement of the frame in respect to the box, thereby to limit the movements of the frame to those parallel with the axis X for example by means of telescopic or other members, whereas it would be preferable for the frame to have a certain freedom of movement in respect to the axle either in a transverse or inclined direction to the axis X.

To this end, according to the present invention, a cylindrical pin 15 vertically directed downwards along the axis X of the spring 14 is rigidly fixed to the lower face of the frame. A peripheral terminal flange 17a of a sleeve 17 extending vertically upwards and coaxial with the pin 15 is fixed by means of bolts 16 (Fig. 2) to the bracket 13.

The outer diameter of the pin 15 is considerably smaller than the inner diameter of the sleeve 17. The sleeve is open at either end. The sleeve and the pin therefore provide two relatively movable telescopic members, the extent of the movement depending upon the characteristics of the spring 14.

The upper end of the pin 15 has a cone-shaped enlargement 15a whilst the free end of the pin has an extension 15b of reduced diameter and a threaded axial hole 15c.

A sleeve or sheath 18 is fitted on to the pin 15; the upper end of this sheath fits over the cone-shaped enlargement 15a of the pin 15 and the lower end has an internally threaded section 19. A plug 20 having an axial hole, is screwed down into this threaded section the head 20a of the plug being so formed that it may be operated by a screw-wrench.

A bolt 21 extends through the axial hole in the plug 20 and is screwed into the threaded hole 15c of the pin 15. It can easily be seen that by suitably screwing down the bolt 21 and the plug 20 a certain adjustable axial load is applied to the sheath 18 for pressing it firmly against the cone-shaped enlargement 15a so that the sheath remains fast with the pin 15.

The outer surface of the sheath 18 within the axial length of the sleeve 17, consists of zones having alternately increasing and decreasing cross-sectional areas, as indicated by 18a—18g. Therefore, for example, the zone 18a comprises a frustum of a cone-shaped surface converging downwards, the smaller base of which merges into a second frustum cone-shaped surface 18b converging upwards. This pair of surfaces 18a—18b of alternately decreasing and increasing cross-sectional area is followed in an axial direction by a second pair 18c—18d and a third pair 18f—18g. The way in which the cone-shaped surfaces connect at their larger bases is not particularly important. It is instead desirable for the connections at the smaller bases to be gradual and smooth. Therefore the latter connecting zones preferably consist each of frustum of hyperboloidal or paraboloidal surfaces, tangent to the two adjacent cone-shaped zones.

According to an alternative embodiment, the pair of surfaces, as 18a, 18b, which together limit an intermediate zone of a minimum cross-sectional area, may, together with such a zone, consist of a single hyperboloidal or paraboloidal revolution surface, so that the outer surface of the sheath 18 shown in Figure 2 will, in effect, consist of three frustum of hyperboloidal or paraboloidal revolution surfaces 18a, 18b; 18c, 18d and 18f, 18g. In this way the peripheral surface of the shealth 18 exhibits three annular grooves of a very wide profile, and the axial width of these grooves measured between two successive sections of maximum cross-sectional area or diameter shall be greater than the sum of the negative and positive axial strokes (that is, upwards and downwards) of the frame 10 in respect to the bracket 13. So, for example, if the sum of the strokes of the frame is about 6 cm., the axial distance between consecutive sections of maximum diameter as 30, 31, should amount to about 7.5 cm.

The internal peripheral surface of the sleeve 17 is smooth and cylindrical.

Three toric rings 32, 33, 34 of rubber or other similar material are interposed between the outer peripheral surface of the sheath 18 and the inner peripheral surface of the sleeve 17.

These toric rings, when free, have each a circular cross-section.

On assembly, each of these toric rings is forcibly fitted over the sheath 18 until it reaches its respective section of minimum diameter on the sheath, as shown in the drawing. Furthermore, the inner diameter of the sleeve 17 is proportioned in such a way as to produce a radial precompression of rings 32—34 against the sheath, so that the rings assume each a squashed cross-sectional shape. In other words, the radial distance between any one of the sections of minimum diameter on the sheath 18 and the facing section of the internal peripheral surface of the sleeve is smaller than the original cross-sectional diameter of the relative toric rubber ring.

In operation, each of the rubber rings forms a rolling body between the facing surfaces of elements 17 and 18, so that these elements are axially guided with respect of each other, whilst the toric rings roll on the above mentioned facing surfaces. At the same time, however, since each of these rolling bodies is made of a resilient material, it allows the pin 15 and its sheath 18 some limited transverse and angular movement in respect to the sleeve 17. It is to be noted that by varying the conditions illustrated in Fig. 2 in one of the axial directions, rubber rings 32—34 are subjected to increasing stress. That is, each ring will be enlarged as a result of rolling on a cone-shaped surface towards its larger base, and its cross-section will be subjected to greater radial compression because the ring wedges between a cone-shaped surface on one side and a cylindrical surface on the other. Consequently, by virtue of the material of the ring, the latter tends in each case, and wherever conditions permit it, to return to the condition of minor strain, that is the condition in which it finds itself at the section of minimum diameter on the sheath 18. This fact, combined with the appropriate axial extension of the above mentioned grooves is sufficient to ensure permanently the mutual spacing between rings 32—34, without need of special spacing cages or other similar elements interposed between successive rings.

It is evident that surfaces, as 18a—18g, could be obtained directly on the pin 15 without need of the sheath 18, nevertheless, there are some advantages in the use of a sheath both when assembling and in operation, for whilst permitting the use of a pin 15 for example of steel and in any case generally of a material offering a high resistance, it allows a surface for rolling 18a—18g of a convenient material to be achieved. On the other hand, this means that the guiding device can be assembled in a single compact unit, comprising elements 18, 32—34 and 17, which is subsequently joined to the pin 15 and to the bracket 13 by means of bolts 21 and 16 respectively, when the suspension is assembled.

It is also evident that, the principle of this invention remaining unaltered, the surface having alternately and gradually decreasing and increasing cross-sectional area or diameter can be placed on the internal periphery of the sleeve 17 instead of on the pin 15 or the sheath 18, or alternatively, on the sleeve as well as on the sheath.

In this latter case, and taking into consideration the vehicle under static load conditions, the sections of minimum diameter on the sheath 18 shall be facing the sections of maximum inner diameter of the sleeve 17 and vice versa, so that each of the rubber rings will be placed within an annular axially-lengthened gap, whose radial thickness progressively decreases from a central section in two axial directions.

Finally, several further modifications can be made to the embodiment as shown in the drawing without departing from the spirit of the invention, as specified in the following claims.

What I claim is:

1. In a vehicle suspension system comprising a frame and an axle box, a bracket fast with the axle box, a helical suspension spring vertically extending between the frame and bracket for resiliently supporting the frame from the box, and an elastic guide means between the frame and bracket comprising a pin rigidly attached to and depending from the frame coaxially of the spring, said pin having a threaded bore at its lower end, an upstanding cylindrical sleeve on the bracket freely receiving the pin, a frusto-conical seat at the upper end portion of the pin, a tubular sheath fitted on the pin, screw means depending from the lower and threaded end of the pin and the sheath engaging and adjustably pressing the sheath against the said seat, a plurality of alternate zones on the outer surface of the sheath having progressively increasing and decreasing diameter thereby providing a plurality of alternate sections on the sheath having maximum and minimum outer diameter, respectively, and a toric ring of rubber fitted on the sheath at each section of minimum diameter, the said ring being radially compressed between and rollable on the sheath and sleeve.

2. In a vehicle suspension system comprising a frame and an axle box, a bracket fast with the axle box, a helical suspension spring vertically extending between the frame and bracket for resiliently supporting the frame from the box, and an elastic guide means between the frame and bracket comprising a pin rigidly attached to and depending from the frame coaxially of the spring said pin having a threaded bore at its lower end, an upstanding cylindrical sleeve on the bracket freely receiving the pin, a frusto-conical seat at the upper end portion of the pin, a tubular sheath fitted on the pin having an internally threaded lower end section, an axially bored plug member screwed into the lower end section of the sheath, a bolt axially screwed into the bore of the pin through the bore in the plug and engaging the plug thereby to maintain the sheath in a pressure engagement with the said fruto-conical seat, a plurality of alternate zones on the outer surface of the sheath having progressively increasing and decreasing diameter thereby providing a plurality of alternate sections on the sheath having a maximum and a minimum outer diameter, respectively, and a toric ring of rubber fitted on the sheath at each section of minimum diameter, the said ring being radially compressed between and rollable on the sheath and sleeve.

References Cited in the file of this patent

UNITED STATES PATENTS

| 2,567,469 | Borgeaud et al. | Sept. 11, 1951 |

FOREIGN PATENTS

| 453,213 | Great Britain | June 8, 1955 |
| 132,831 | Sweden | Sept. 4, 1951 |